(12) United States Patent
Betsumori et al.

(10) Patent No.: US 7,514,002 B1
(45) Date of Patent: Apr. 7, 2009

(54) METHOD FOR REMOVING PHOSPHORUS AND METHOD FOR REUTILIZING RECOVERED PHOSPHORUS

(75) Inventors: Keiichi Betsumori, Toyama (JP); Takashi Matsubara, Toyama (JP); Hiroshi Saiki, Ibaraki (JP); Isao Karube, Ibaraki (JP)

(73) Assignee: Hokuriku Electric Power Company, Toyama (JP)

( * ) Notice: Subject to any disclaimer, the term of this patent is extended or adjusted under 35 U.S.C. 154(b) by 0 days.

(21) Appl. No.: 11/979,906

(22) Filed: Nov. 9, 2007

(51) Int. Cl.
*C02F 1/42* (2006.01)
(52) U.S. Cl. .................. 210/660; 210/683; 210/906
(58) Field of Classification Search .......... 210/660, 210/683, 906
See application file for complete search history.

(56) References Cited

U.S. PATENT DOCUMENTS

| | | | | |
|---|---|---|---|---|
| 3,669,701 A | * | 6/1972 | Biederman | 106/706 |
| 4,530,765 A | * | 7/1985 | Sabherwal | 210/663 |
| 4,615,809 A | * | 10/1986 | King | 588/315 |
| 4,707,270 A | * | 11/1987 | Kobayashi et al. | 210/683 |
| 6,893,751 B2 | * | 5/2005 | Naji et al. | 428/703 |

FOREIGN PATENT DOCUMENTS

| JP | 09-310373 | 12/1997 |
|---|---|---|
| JP | 2004-113885 | 4/2004 |

OTHER PUBLICATIONS

Valsami-Jones, Eugenia, "Phosphorus in Environmental Technology: Principles and Applications," IWA Publishing, 2004, at pp. 300-301.*

* cited by examiner

*Primary Examiner*—Chester T Barry
(74) *Attorney, Agent, or Firm*—Wenderoth, Lind & Ponack, L.L.P.

(57) ABSTRACT

A method for removing phosphorus is provided in which eutrophic water as a treatment target is supplied to fly ash thereby removing phosphorus contained in the eutrophic water. The fly ash includes about 3% or more calcium oxide as a component. Alternatively, the fly ash consists of a double-structure embedding fine particles in a cavity of a hollow-particle structure having a hole in a part of the surface. Alternatively, the fly ash includes about 3% or more calcium oxide as a component and consisting of a double structure embedding fine particles in a cavity of a hollow-particle structure having a hole in a part of the surface.

8 Claims, 12 Drawing Sheets

| | FLY ASH A | FLY ASH B | FLY ASH C | FLY ASH D | FLY ASH E | FLY ASH F |
|---|---|---|---|---|---|---|
| $SiO_2$ | 48.57 | 49.02 | 58.12 | 59.44 | 48.16 | 65.62 |
| $Al_2O_3$ | 31.34 | 23.35 | 24.31 | 20.61 | 25.23 | 18.24 |
| $Na_2O$ | 0.13 | 0.49 | 0.39 | 0.65 | 0.62 | 0.35 |
| $K_2O$ | 0.62 | 2.09 | 0.81 | 1.37 | 2.09 | 1.23 |
| $SO_3$ | 0.57 | 0.46 | 0.34 | 0.46 | 0.47 | 0.29 |
| $Fe_2O_3$ | 5.72 | 6.91 | 5.72 | 10.08 | 9.2 | 7.55 |
| CaO | 4.86 | 4.25 | 2.89 | 2.53 | 2.59 | 1.05 |
| MgO | 1.58 | 1.5 | 1.28 | 1.2 | 1.24 | 0.95 |
| $TiO_2$ | 2.63 | 1.35 | 1.43 | 1.07 | 1.34 | 0.81 |
| $P_2O_5$ | 0.13 | 0.86 | 0.23 | 0.65 | 0.27 | 0.37 |

METHOD FOR REMOVING PHOSPHORUS AND METHOD FOR REUTILIZING RECOVERED PHOSPHORUS

BACKGROUND OF THE INVENTION

1. Field of the Invention

The present invention relates to a method for removing phosphorus contained in eutrophic water and a method for reutilizing recovered phosphorus.

2. Description of the Related Art

Conventionally, as one factor for water pollution in enclosed water areas, such as lakes or rivers, there has been elution of phosphorus contained in eutrophic water. As one method for treating eutrophic water by reliably adsorbing such phosphorus, there has been a method that includes introducing an adsorbent such as zeolite into eutrophic water and allowing eutrophic components to be adsorbed thereon, followed by dredging to discharge the eutrophic components out of the water area, as disclosed in, for example, Japanese Patent Application Laid-open No. H9-310373. Also, there has been also a method that includes laying a granulated material of coal ash on the bottom of a water area as a treatment target such as a lake to adsorb phosphorus, as disclosed in, for example, Japanese Patent Application Laid-open No. 2004-113885.

However, the methods disclosed in Japanese Patent Application Laid-open No. H9-310373 and Japanese Patent Application Laid-open No 2004-113885 introduce zeolite or laying a granulated material of coal ash on the bottom, and they have a disadvantage that when the capacity of phosphorus adsorption is reached, the adsorption effect is lost and thus the adsorbent itself such as zeolite or a granulated material of coal ash should be removed by dredging, thus increasing costs such as labor cost. Further, these methods only consider removing phosphorus from eutrophic water, and there is no reference to efficient recovery of phosphorus and effective reutilization of recovered phosphorus.

SUMMARY OF THE INVENTION

It is an object of the present invention to at least partially solve the problems in the conventional technology.

According to one aspect of the present invention, a method for removing phosphorus includes supplying eutrophic water as a treatment target to fly ash containing about 3% or more calcium oxide as a component, thereby removing phosphorus contained in the eutrophic water.

According to another aspect of the present invention, a method for removing phosphorus includes supplying eutrophic water as a treatment-target to double-structure fly ash embedding fine particles in a cavity of a hollow-particle structure having a hole in a part of a surface thereof.

According to still another aspect of the present invention, a method for removing phosphorus includes supplying eutrophic water as a treatment target to double-structure fly ash containing about 3% or more calcium oxide as a component and embedding fine particles in a cavity of a hollow-particle structure having a hole in a part of a surface thereof, thereby removing phosphorus contained in the eutrophic water.

According to still another aspect of the present invention, a method for reutilizing recovered phosphorus includes using fly ash used in removing phosphorus contained in eutrophic water in a water area as a treatment target by the method for removing phosphorus described above, as a phosphorous fertilizer for agriculture and horticulture.

According to still another aspect of the present invention, a method for removing phosphorus includes granulating fly ash containing about 3% or more calcium oxide as a component, or solidifying the fly ash into agglomerates and subsequent milling and refining; allowing the obtained fly ash to flow into a rangeland as a treatment target or into a water area thus spreading directly to an eutrophicated land surface; and adsorbing phosphorus contained in rainwater with which feces and urine from domestic animals on that land surface are washed, thereby removing phosphorus.

According to still another aspect of the present invention, a method for reutilizing recovered phosphorus includes using fly ash having phosphorus adsorbed therein by the method for removing phosphorus described above, as it is as a phosphorous fertilizer for growing grass.

The above and other objects, features, advantages and technical and industrial significance of this invention will be better understood by reading the following detailed description of presently preferred embodiments of the invention, when considered in connection with the accompanying drawings

DETAILED DESCRIPTION OF THE PREFERRED EMBODIMENTS

Exemplary embodiments of a method for removing phosphorus and a method for reutilizing recovered phosphorus according to the present invention will be explained below in detail with reference to the accompanying drawings. Note that the present invention is not limited to the embodiments and various modifications can be made without departing from the spirit of the invention.

A method for removing phosphorus according to an embodiment of the present invention is based on using specific fly ash satisfying predetermined conditions in coal ash to remove and recover phosphorus contained in eutrophic water as a treatment target. When coal ash is used, a mechanism of adsorption of phosphorus onto coal ash is described first.

Figure 16:
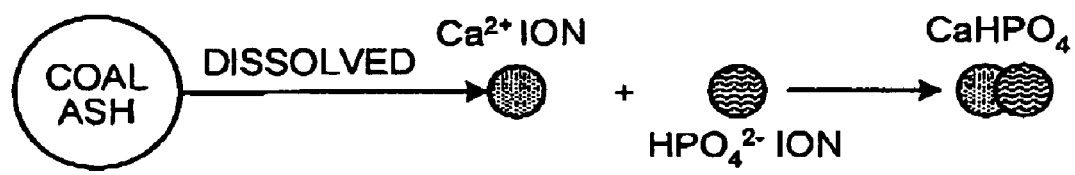
FIG. 16 is a schematic diagram illustrating a conventionally known mechanism of adsorption of phosphorus into coal ash.

First, FIG. 16 is a schematic diagram illustrating a conventional mechanism of phosphorus adsorption. The conventional mechanism of phosphorus adsorption, under an established theory that coal ash such as fly ash is spherical with no cavity, such as shown by a glass ball, assumes that calcium (Ca) contained in coal ash is dissolved as a calcium ion ($Ca^{2+}$) to bind to a phosphoric ion ($HPO_4^{2-}$) in a liquid thereby being insolubilized as calcium hydrogen phosphate ($CaHPO_4$) in the liquid. Such a mechanism of phosphorus adsorption is utilized in removal of phosphorus from eutrophic water. This mechanism can be confirmed owing to precipitation of calcium phosphate upon addition of phosphoric acid to water brought into contact with coal ash, however, when such a mechanism of phosphorus adsorption is utilized, efficient recovery of phosphorus is difficult.

On the other hand, the present inventors newly found a mechanism of removal of phosphorus with fly ash, which demolishes the conventional established theory. Such a mechanism of phosphorus removal assumes, in one aspect, that when fly ash containing about 3% or more calcium oxide (CaO) as a component is dipped in a phosphoric acid solution, phosphorus (P) contained in the phosphoric acid solution reacts with calcium (Ca) in calcium oxide (CaO) contained in the fly ash, to form sparingly-soluble calcium phosphate thereby being precipitated. This mechanism assumes, in another aspect, that when double-structure fly ash having fine particles included in a cavity in a hollow-particle structure having a hole in a part of the surface is dipped in a phosphoric acid solution, phosphorus (P) contained in the phosphoric acid solution flows into the open hole on the surface of the hollow-particle structure, thereby being adsorbed into the inside of the double-structure fly ash.

Figure 1:
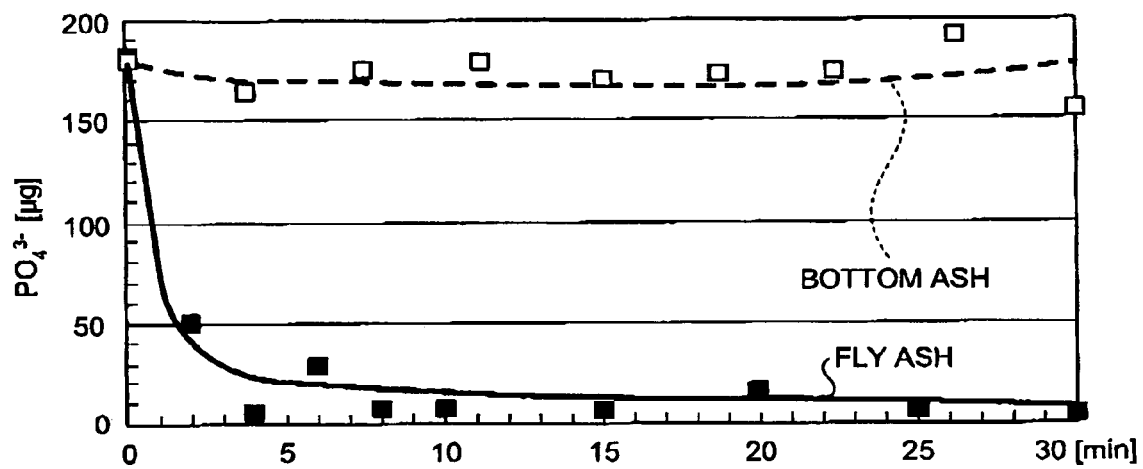
FIG. 1 is a graph of the abilities of fly ash and bottom ash to remove phosphorus.

Such a mechanism of removal could be confirmed by the following procedures. The procedures are described below in order. First, a test of the ability of coal ash to remove phosphorus was carried out in which coal ash was added to, and stirred in, an aqueous solution of phosphoric acid, and the amount of phosphoric acid remaining in its filtrate was measured at regular intervals, thereby examining the ability of coal ash to remove phosphorus, to give measurements as shown in FIG. 1. As the coal ash, two types of coal ashes, that is, fly ash collected from an exhaust gas with a dust collecting equipment and bottom ash discharged from the bottom of a boiler, were used. These measurements represent that, with respect to the fly ash, the amount of phosphoric acid was rapidly reduced and phosphorus was almost removed in about 5 minutes after addition of the fly ash, and with respect to the bottom ash, its effect of removing phosphorus could not be confirmed, and basically it could be confirmed that the fly ash can have an ability to remove phosphorus.

Figure 2:
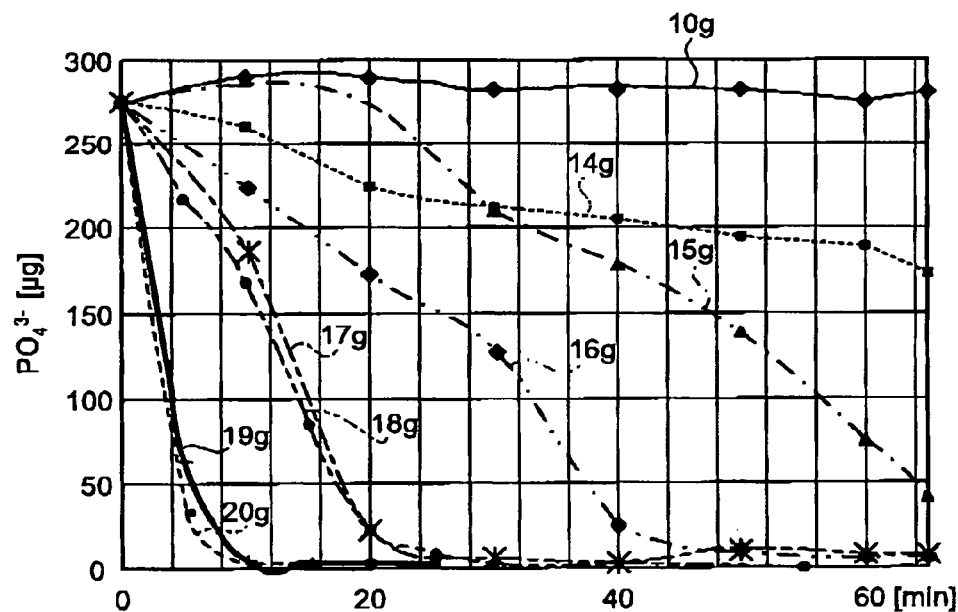
FIG. 2 is a graph of the abilities of fly ash to remove phosphorus according to an adding amount of the fly ash.

Fly ash was then added in a varying amount of 10 to 20 grams to an aqueous solution of phosphoric acid, and the solution was stirred and filtered and then measured for its remaining phosphoric acid at regular intervals in the same manner as above, to give measurements as shown in FIG. 2. Such measurements represent that, when fly ash added exceeds a predetermined amount (17 grams in the example shown in FIG. 2), the amount of remaining phosphoric acid is rapidly reduced, so it could be confirmed that at least a predetermined amount of fly ash is necessary for efficient removal of phosphorus from an aqueous solution of phosphoric acid.

Figures 3, 4:
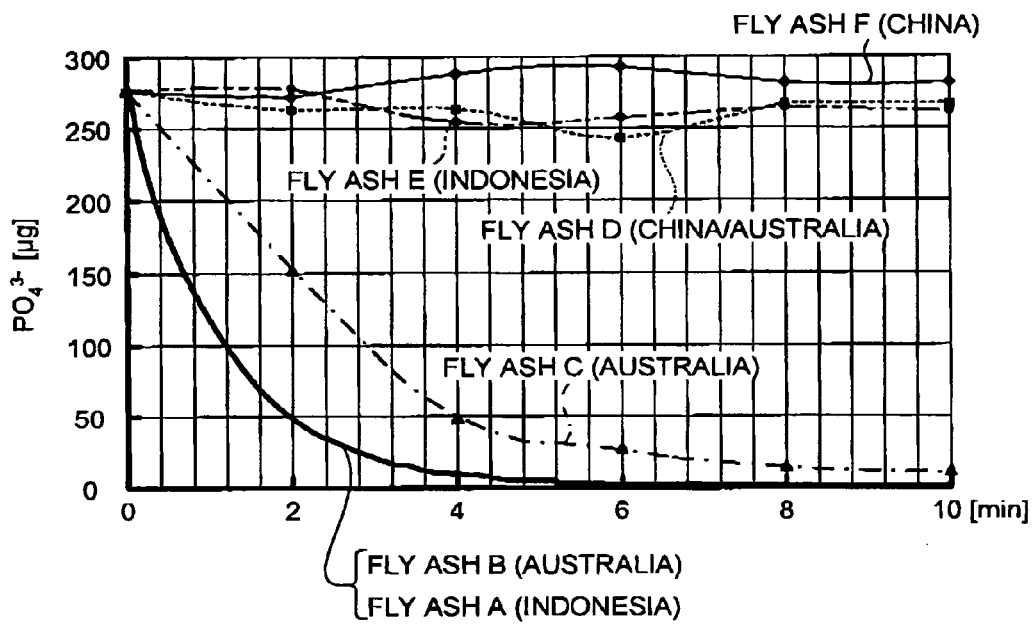
FIG. 3 is a graph of the presence of the abilities of fly ash to remove phosphorus according to the type of the fly ash.
FIG. 4 is a diagram illustrating results of analysis of components in each type of fly ash.

Further, as the fly ash added to an aqueous solution of phosphoric acid, six types of fly ashes different in the country of production were used, and each type of fly ash was stirred and filtered and examined for its remaining phosphoric acid at regular intervals in the same manner as above, and their abilities to remove phosphorus were compared to give measurements as shown in FIG. 3. In the six types of fly ashes used, A and E were derived from Indonesia coal, B and C from Australian coal, D from the mixture of Chinaese coal/Australian coal, and F from Chinese coal. These measurements reveal that three types of fly ashes A, B, and C have an ability to remove phosphorus, while the other three types of fly ashes D, E, and F hardly have an ability to remove phosphorus, and it could thus be confirmed that the ability of fly ash to remove phosphorus varies according to its type.

As described above, the ability of fly ash to remove phosphorus varies according to its type, the cause of which was studied by comparing the components in the respective fly ashes, whereby the results shown in FIG. 4 were obtained. In FIG. 4, the fly ashes A, B, and C shown in the shaded region have an ability to remove phosphorus, while the other fly ashes D, E, and F do not have an ability to remove phosphorus. Among the components configuring the fly ash, those components considered to react with phosphorus (P) to be removed are $Na_2O$ (sodium oxide), $K_2O$ (potassium oxide), and CaO (calcium oxide) among which the component forming a particularly sparingly-soluble compound is CaO (calcium oxide). That is, CaO shows the following reaction:

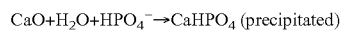

$$CaO + H_2O + HPO_4^- \rightarrow CaHPO_4 \text{ (precipitated)}$$

According to the results shown in FIG. 4, the Cao (calcium oxide) contents of the three types of fly ashes A, B, and C having an ability to remove phosphorus are 4.86%, 4.25%, and 2.89%, respectively, which are higher than those of the three types of fly ashes D, E, and F not having an ability to produce phosphorus, and CaO is estimated to form sparingly-soluble calcium phosphate. Accordingly, it was made possible to confirm the mechanism of removal that when fly ash containing about 3% or more calcium oxide (CaO) as a component is dipped in an aqueous solution of phosphoric acid, phosphorus (P) contained in the solution of phosphoric acid reacts with calcium (Ca) in calcium oxide (CaO) contained in the fly ash, to form sparingly-soluble calcium phosphate thereby being precipitated.

Figure 5:
FIG. 5 is a photograph of a surface of fly ash taken by an electron microscope.

Subsequently, when the surface of a fly ash particle was observed under an electron microscope to confirm precipitation of the sparingly-soluble phosphorus compound, a structure as shown in the photograph in FIG. 5 was observed. That is, the conventional established theory assumes that the fly ash particle has a beautiful spherical structure with no cavity, such as shown by a glass ball. However, a certain type of fly ash particle 1 having an ability to remove phosphorus as described above could be confirmed to have a double structure having a number of fine particles 3 included in a cavity in a hollow-particle structure having a hole 2 in a part of the surface, as shown in the photograph in FIG. 5, thus demolishing the established theory. In the fly ash having an ability to remove phosphorus, therefore, it is thought that as described above, calcium in calcium oxide contained in the fly ash reacts with phosphorus thereby forming a sparingly-soluble phosphorus compound and simultaneously adsorbing phosphorus onto the inside of the double structure.

Figure 6:
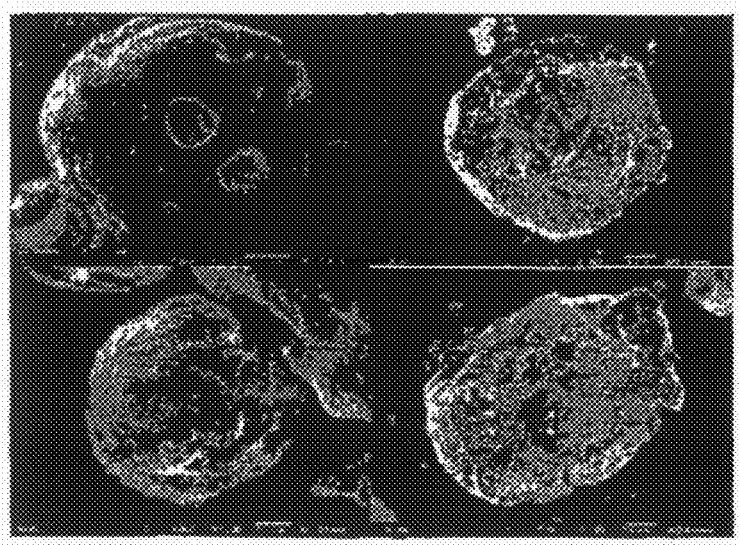
FIG. 6 is a photograph of the surface and an internal structure of fly ash taken by an electron microscope.

The fly ash particles originally having a hollow-particle structure occur as relatively large particles having a diameter larger than a predetermined diameter, and therefore, fly ash particles having a relatively large diameter of 53 to 74 micrometers after sifting were photographed under an electron microscope to give the surface and internal structure thereof shown in the photograph in FIG. 6. In FIG. 6, two left photographs show surfaces, while two right photographs show the corresponding internal structures. As can be seen from the left photographs of the surfaces, fine particles present in a cavity having a hollow-particle structure can be seen in an open hole in a part of the surface, and from the right internal structure, it can be seen that a large number of fine particles in the cavity are included in a complicated porous shape.

Figure 7:
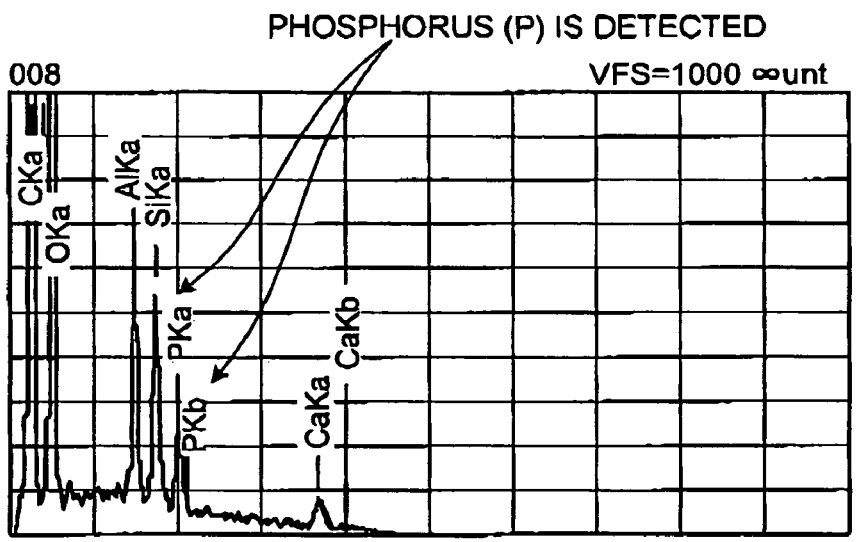
FIG. 7 is a characteristic diagram illustrating an element distribution in the inside of a double structure analyzed by an EDX.

The fly ash particles used in removal of phosphorus by dipping them in an aqueous solution of phosphoric acid were dried, ground, and analyzed for an element distribution in a part in the inside of their double structure with an energy dispersive X-ray fluorescence analyzer (EDX), to give the results shown in FIG. 7. In the analysis results shown in FIG. 7, a peak of phosphorus was detected, so the adsorption of phosphorus into the inside of the double structure could be confirmed.

Figure 8A:
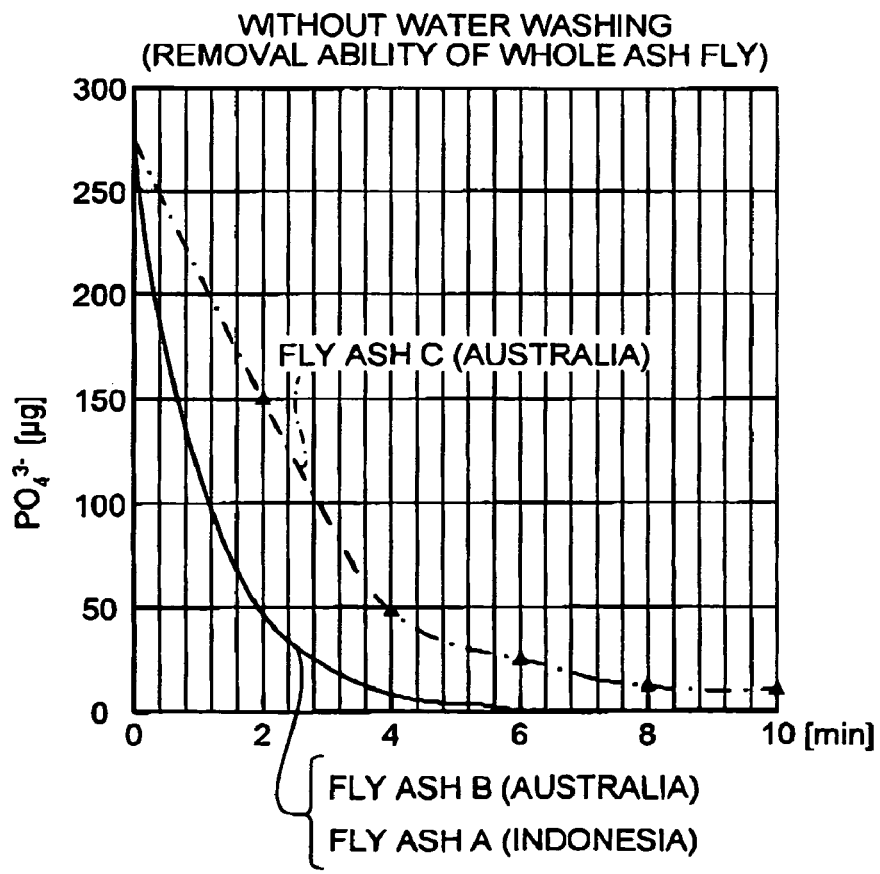
FIG. 8A is a graph of the abilities of fly ash without water washing.
Figure 8B:
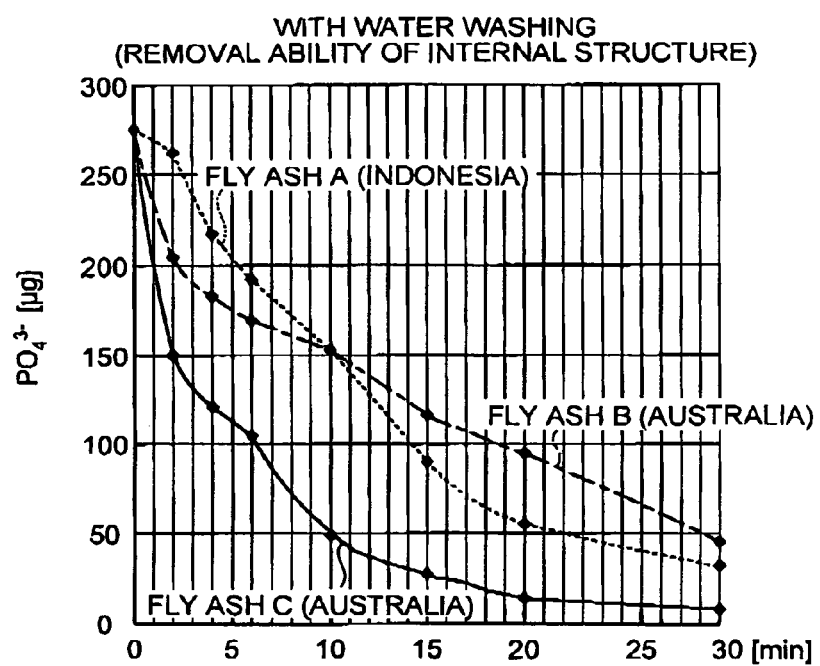
FIG. 8B is a graph of the abilities of fly ash with water washing.

For verifying the ability of fly ash to adsorb phosphorus into the double structure thereof, the tendency for fly ash without water washing to remove phosphoric acid was compared with the tendency for fly ash with water washing to remove phosphoric acid, to give the results shown in FIG. 8A and FIG. 8B. FIG. 8A depicts the characteristic of the fly ash (fly ash A, B, or C without water washing) to decrease the amount of phosphoric acid remaining in a solution of phosphoric acid, that is, the ability of the whole of the fly ash to remove phosphorus. On the other hand, FIG. 8B depicts the characteristic of the fly ash (the fly ash A, B, or C with water washing to remove its calcium component on the surface) to decrease the amount of phosphoric acid remaining in a solution of phosphoric acid, that is, the ability of only the double structure of the fly ash to remove phosphorus. As can also be seen from FIG. 8B, the fly ash with water washing reduces the amount of remaining phosphoric acid steadily though at a lower rate, thus verifying adsorption of phosphorus into the inside of the double structure.

Figure 8C:
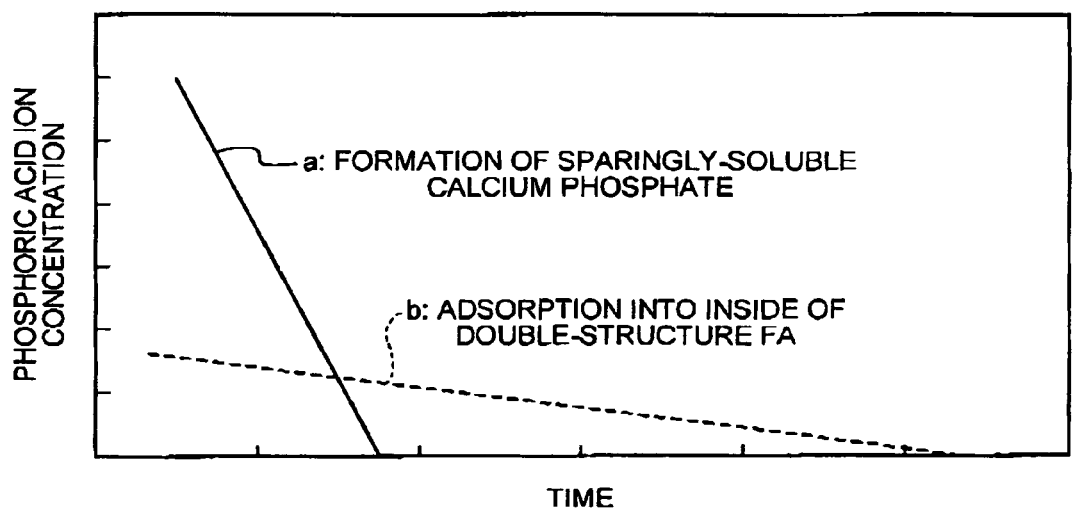
FIG. 8C is a schematic diagram illustrating a factor for the effect of fly ash to adsorb phosphorus.

That is, it could be confirmed that when the results shown in FIGS. 8A and 8B are qualitatively expressed, the effect of the fly ash to adsorb phosphorus is a combined effect of two effects, that is, an effect of forming sparingly-soluble calcium phosphate expressed as characteristic "a" in FIG. 8C and an effect of adsorption into the inside of the double-structure of the fly ash expressed as characteristic "b" in FIG. 8C.

It was thereby made possible to confirm the mechanism of removal that when the double-structure fly ash having fine particles included in a cavity in a hollow-particle structure having a hole in a part of the surface is dipped in a phosphoric acid solution, phosphorus (P) contained in the phosphoric acid solution flows into the open hole on the surface of the hollow-particle structure thereby being adsorbed into the inside of the double-structure fly ash.

Figure 9A:
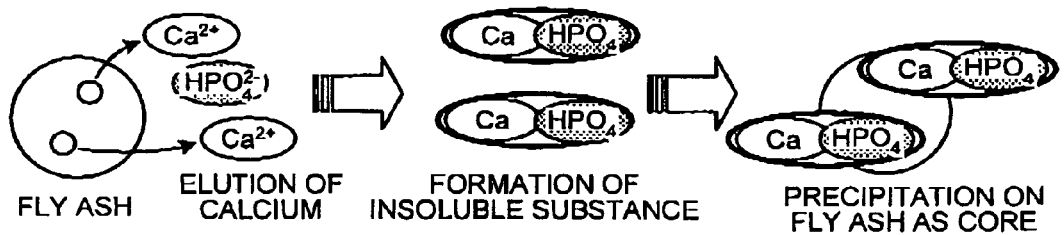
FIG. 9A is a schematic diagram illustrating a first mechanism of adsorption and removal of phosphorus.
Figure 9B:
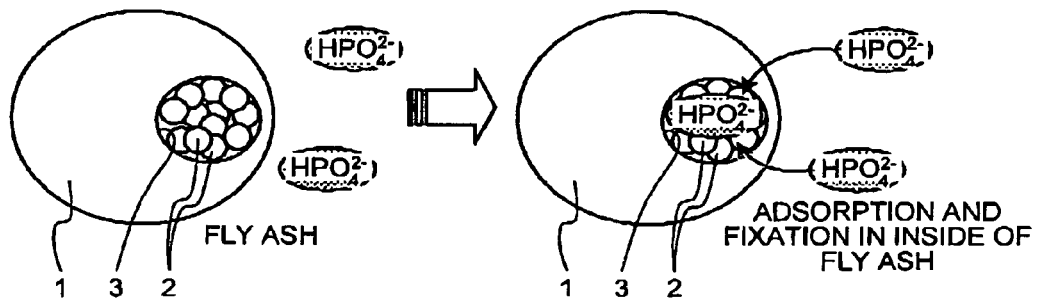
FIG. 9B is a schematic diagram illustrating a second mechanism of adsorption and removal of phosphorus.

Accordingly, the above mechanism of adsorption and removal of phosphorus, newly found by the present inventors, is as shown in FIGS. 9A and 9B. FIG. 9A depicts the first mechanism of adsorption and removal of phosphorus, and FIG. 9B depicts the second mechanism of adsorption and removal of phosphorus. The first mechanism of adsorption and removal of phosphorus as shown in FIG. 9A is that when fly ash containing about 3% or more calcium oxide (CaO) as a component is dipped in a solution of a phosphoric ion ($HPO_4^{2-}$), a calcium ion ($Ca^{2+}$) is generated from calcium oxide, then eluted from calcium oxide (CaO) contained in the fly ash, and this eluted calcium ion ($Ca^{2+}$) reacts with a phosphorus (P)-containing phosphoric ion ($HPO_4^{2-}$) to form an insoluble substance calcium hydrogen phosphate ($CaHPO_4$), and the formed calcium hydrogen phosphate ($CaHPO_4$) is precipitated on the fly ash as a core.

The second mechanism of adsorption and removal of phosphorus as shown in FIG. 9B is that when the double-structure fly ash 1 having the fine particles 3 included in a cavity in a hollow-particle structure having a hole 2 in a part of the surface is dipped in a phosphoric ion ($HPO_4^{2-}$) solution, the phosphorus (P)-containing phosphoric ion ($HPO_4^{2-}$) flows into the hole 2 on the surface of the hollow-particle structure thereby being adsorbed into and fixed in the inside of the double-structure fly ash 1.

Hence, the method for removing phosphorus and the equipment for removing phosphorus in the present embodiment are based, in one aspect, on use of fly ash containing about 3% or more calcium oxide (CaO) as a component to remove and recover phosphorus contained in eutrophic water as a treatment target, and in another aspect, on use of double-structure fly ash having fine particles included, in a porous shape, in a cavity in a hollow-particle structure having a hole in a part of the surface. As used herein, the fly ash is one type of coal ash where ash particles in a state melted by combustion for example in a coal thermal power plant and floating in a high-temperature combustion gas were formed, upon cooling in an outlet of a boiler, into spherical fine particles, and the fly ash is based on silica, alumina, or the like and collected with an electric dust collector. In such fly ash, the one satisfying the conditions described above is used.

Figure 10:
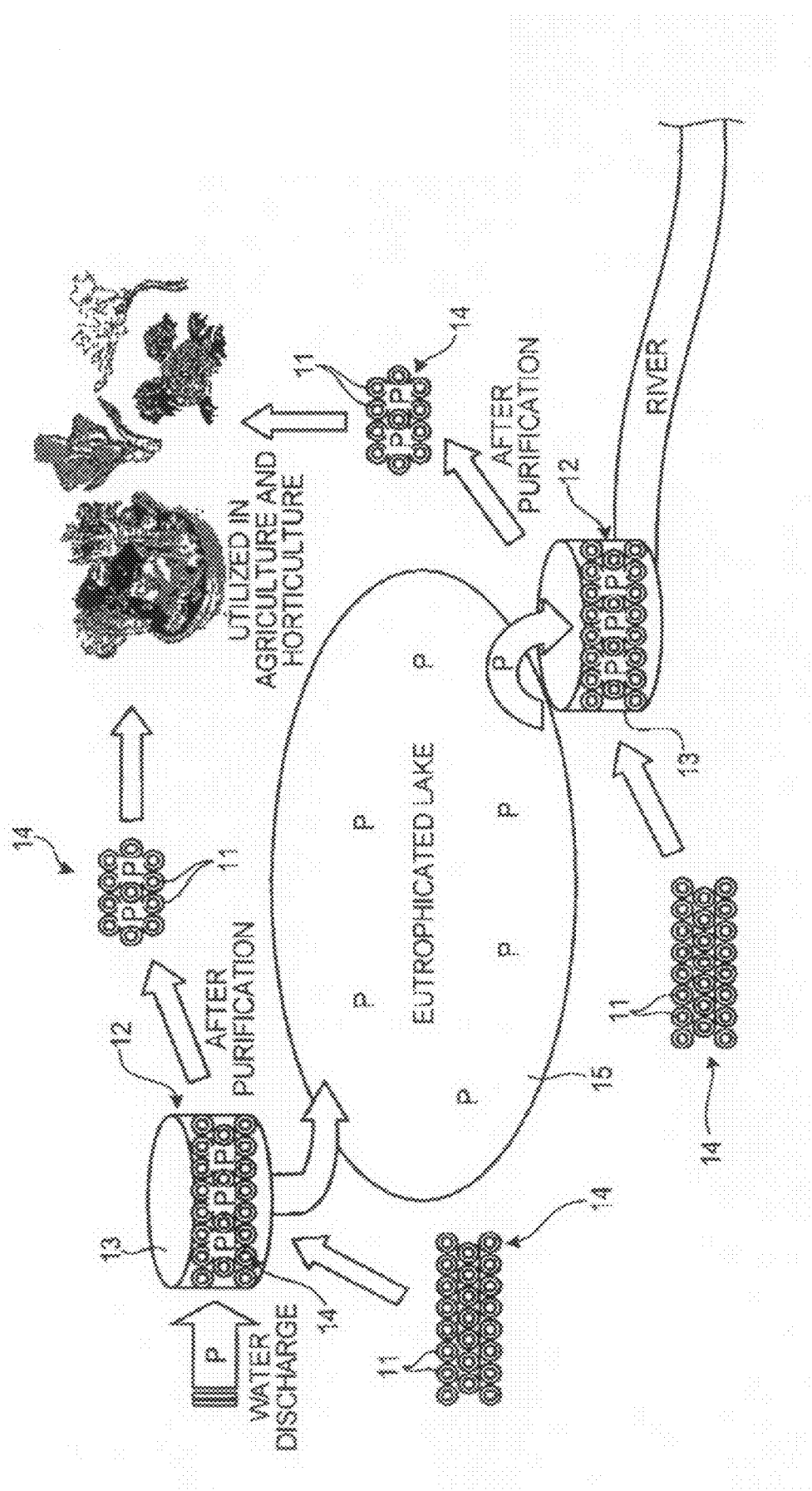
FIG. 10 is a schematic diagram illustrating configuration example of a system in a field for realizing a method for removing phosphorus according to an embodiment of the present invention.

FIG. 10 is a schematic diagram illustrating a configuration example of a system in a field for realizing the method for removing phosphorus in the present embodiment utilizing the mechanism of removal of phosphorus described above. First, a treatment equipment 12 charged with fly ash 11 satisfying the specific conditions described above is prepared. The treatment equipment 12 consists of a housing 13 into which the fly ash 11 in a predetermined or more amount to exhibit an ability to remove phosphorus is filled so as to be replaceable and to flow water therethrough. In this case, the water-flow and handling of the fly ash 11 in the form of individual particles are problematic, and therefore, fly ash 14 granulated with a suitable binder into agglomerates having a size equal to or more than such a predetermined size as to suitably exhibit an ability to remove phosphorus is preferably used. In place of the granulated fly ash 14, for example, a product obtained by solidifying fly ash into agglomerates followed by milling and refining to a size equal to or more than the predetermined size, can also be used.

The treatment equipment 12 is arranged in a suitable place outside the system of an enclosed water area 15 as a treatment target having phosphorus-containing eutrophic water, such as a lake as a treatment target. The equipment is arranged in the present embodiment both in that side of the water area 15 as a treatment target into which discharged water flows in and in that side of the water area 15 as a treatment target from which water is discharged into a downstream river, but can be arranged in either side. Discharged water to flow into the water area 15 as a treatment target, or eutrophic water pumped up with a pump or the like (not shown) from the water area 15 as a treatment target, is introduced into the treatment equipment 12 and then flowed through the granulated fly ash 14 charged in the treatment equipment 12, and water thus cleaned is discharged from the lower side of the treatment equipment 12 into a treatment target area 15 or into a downstream river.

By allowing eutrophic water to flow through the treatment equipment 12 in this manner, phosphorus contained in the eutrophic water is removed from the eutrophic water according to the mechanism of removal described above and then recovered in the individual fly ashes 11 in the granulated fly ash 14, while the eutrophic water from which phosphorus was removed is discharged into the treatment target area 15 or into a downstream river.

Figure 11:
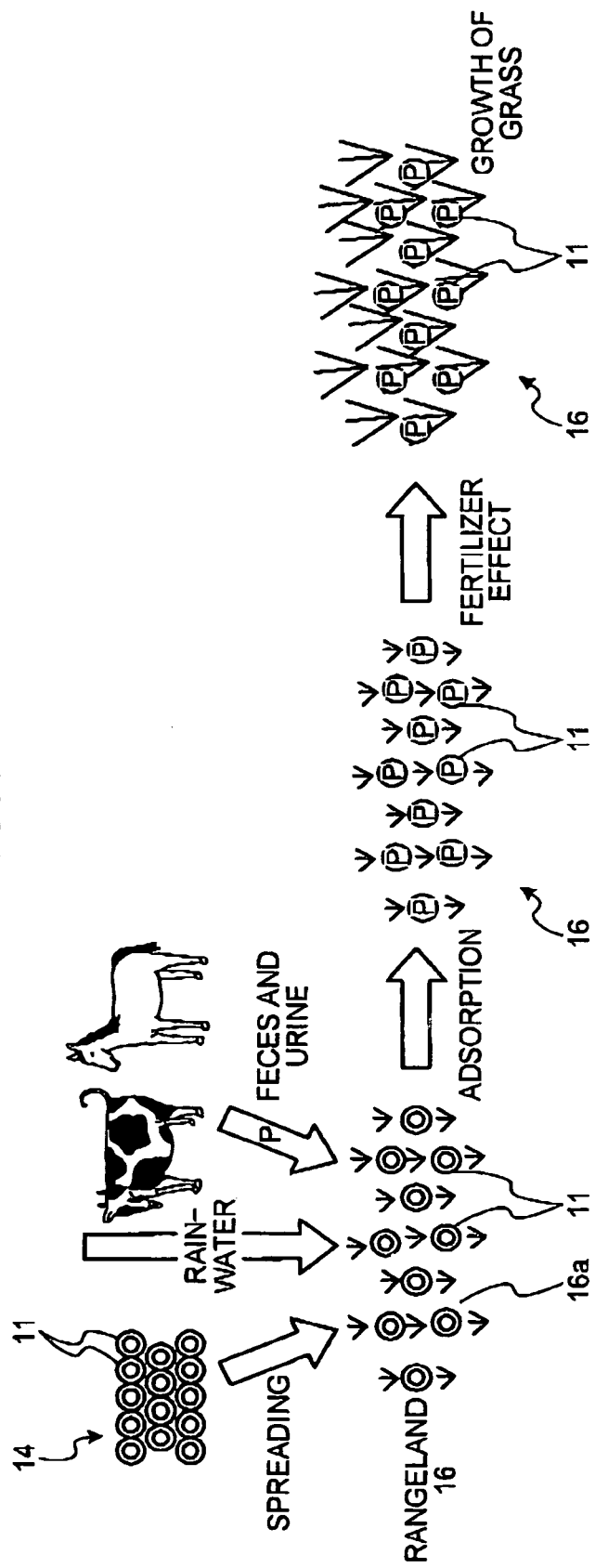
FIG. 11 is a schematic diagram illustrating configuration example of another system in a field for realizing the method for removing phosphorus according to the embodiment of the present invention.

FIG. 11 is a schematic diagram illustrating configuration example of another system in the field for realizing the method for removing phosphorus in the present embodiment utilizing the mechanism for removing phosphorus described above. In FIG. 10, the treatment target is a water area such as an eutrophic lake or the like, while in FIG. 11, the treatment target is a rangeland 16 on which domestic animals such as cattle and horses are bred. First, fly ash 11 satisfying at least the specific conditions described above is prepared. In this case, the water-flow and handling of the fly ash 11 in the form of individual particles are problematic, and therefore, the fly ash 14 granulated with a suitable binder into agglomerates having a size equal to or more than such a predetermined size as to suitably exhibit an ability to remove phosphorus is preferably used. In place of the granulated fly ash 14, for example, a product obtained by solidifying fly ash into agglomerates followed by milling and refining to a size equal to or more than the predetermined size, can also be used.

The granulated fly ash 14 is allowed to flow into the rangeland 16 (or a water area) as a treatment target, thereby spreading directly to an eutrophicating land surface 16a. After spreading, phosphorus (P) contained in rainwater with which feces and urine from domestic animals such as cattle and horses on the land surface 16a were washed is adsorbed thereinto, whereby phosphorus (P) is removed. The granulated fly ash 14 having spread and adsorbed phosphorus (P) is left as it is, whereby the fertilizer effect thereof as a phosphorous fertilizer on grass can be exhibited for growth of grass, to allow the grass to growth.

Figure 12:
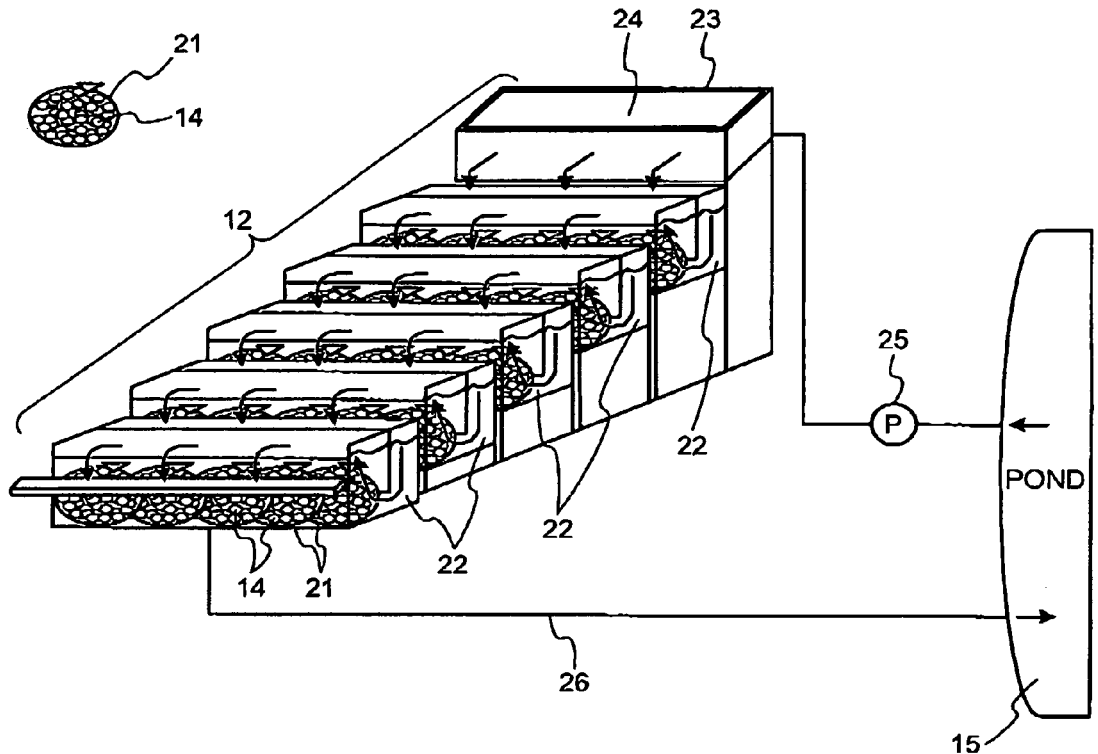
FIG. 12 is a schematic perspective view of an outline of an experimental equipment for simulating practical application in a field.
Figure 13:
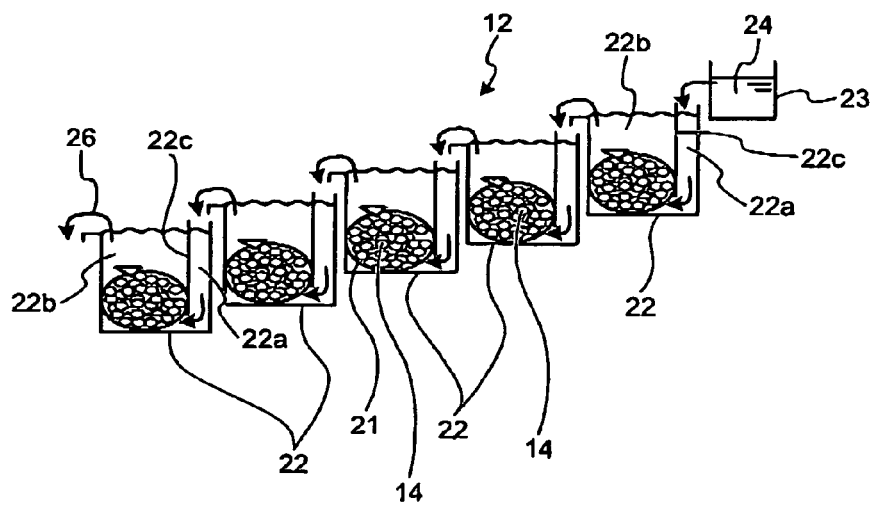
FIG. 13 is a schematic longitudinal sectional view of FIG. 12.
Figure 14:
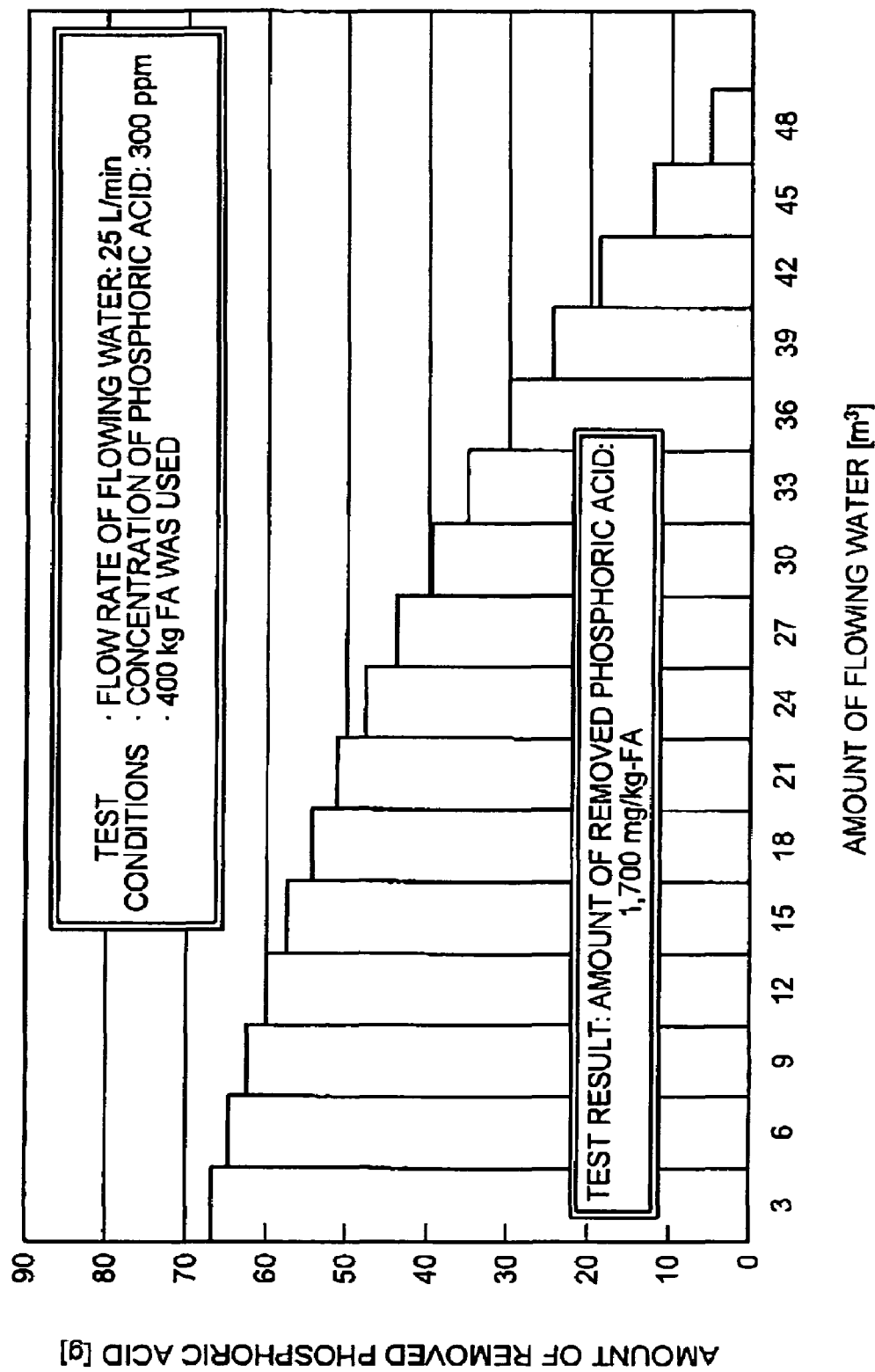
FIG. 14 is a graph of experimental results of a fluctuation in the ability of fly ash to remove phosphorus with an increasing amount of flowing water.

When the practical application in the field as shown in FIG. 10 for example was simulated and the ability of the granulated fly ash 14 to remove phosphorus was tested in the test equipment shown in FIGS. 12 and 13, the results as shown in FIG. 14 were obtained. FIG. 12 is a schematic perspective view of an outline of the test equipment, FIG. 13 is a schematic longitudinal sectional view of the test equipment, and FIG. 14 is a graph of experimental results of a fluctuation in the ability of fly ash to remove phosphorus with an increasing amount of flowing water.

In FIGS. 12 and 13, 40 fly ash bags each being charged with, for example, 10 kilograms of the granulated ash 14 (that is, 400 kilograms of fly ash in total in the 40 bags) are prepared and set in a plurality of water-purifier tanks 22 configuring the treatment equipment 12. In each water-purifier tank 22, a water feeding unit 22a and a purifying unit 22b accommodating a granulated-fly-ash accommodating bag 21 are partitioned with a partition plate 22c therebetween, but can communicate with each other in a lower part of the partition plate 22c to allow water to flow therethrough. The treatment equipment 12 is provided with for example five water-purifier tanks 22 in a staircase pattern, and a water-feed water-storage tank 23 is arranged on the highest step, and water in the water-feed water-storage tank 23 and in the upstream purifying unit 22b flows continuously into the downstream water feeding unit 22a and flows through a gap in the bottom of the partition plate 22c to allow water to flow upward through the purifying unit 22b.

Eutrophic water 24 as a subject of treatment, contained in the water area 15 such as a lake as a treatment target, is pumped up with a pump 25 or the like and stored in the water-feed water-storage tank 23. The water 24 as a subject of treatment in the water-feed water-storage tank 23 is continuously fed to the downstream water-purifier tank 22. As shown by arrows in each water-purifier tank 22, the fed water 24 as a subject of treatment passes from the water feeding unit 22a through a gap in the bottom of the partition plate 22c into the water purifying unit 22b and overflows from the upper part of the purifying unit 22b thereby flowing toward the downstream side. The water 24 as a subject of treatment flows upward through the granulated fly ash 14 in the granulated-fly-ash accommodating bag 21 in the purifying unit 22b, thereby undergoing the action of removing phosphorus as described above. Accordingly, treated water 26 from which phosphorus was removed is discharged from the purifying unit 22b in the lowest water-purifier tank 22.

The amount of flowing treated water 26 purified in the purifying unit 22b in the lowest water-purifier tank 22, and the concentration of phosphorus (the amount of removed phosphoric acid), are measured to determine the relationship between the ability to remove phosphorus and elapsed time of the flow rate of flowing water. According to the results of this test as shown in FIG. 14, the granulated fly ash 14 removes phosphorus at a predetermined flow rate of flowing water, however, the ability thereof to remove phosphorus is decreased with elapsed time and eventually saturated. That is, the sum of the product (integrated value) of the concentration of phosphoric acid (amount of removed phosphoric acid) of passing time in the time unit prior to saturation and the flow rate of flowing water is the ability to remove phosphorus, and when saturation is reached, the fly ash should be replaced with fresh fly ash (granulated fly ash) satisfying the predetermined conditions. In this test example, the concentration of passing phosphoric acid was set at 30 mg/L, the flow rate of flowing water was set at 25 L/min., and the total amount of phosphoric acid removed per one kilogram of the fly ash was 1700 milligrams.

Figure 15:
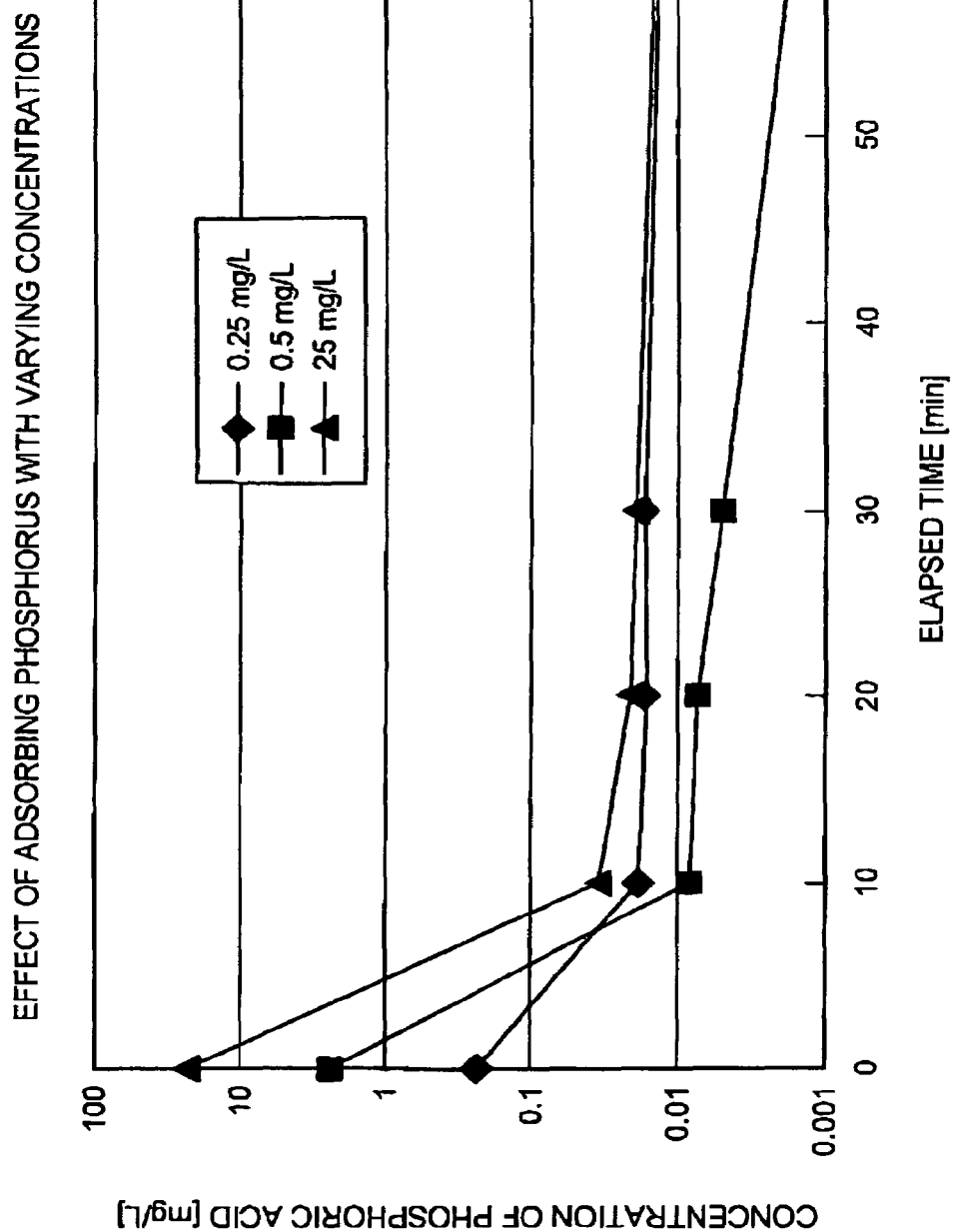
FIG. 15 is a characteristic diagram of experimental results of the effect of fly ash on adsorption of phosphorus with a difference in concentration of phosphoric acid.

In the system of the present invention using the fly ash satisfying the specific conditions, the effect of adsorbing phosphorus at a varying concentration of phosphoric acid as a subject of treatment is examined. For this examination, aqueous solutions of phosphoric acid at 3 concentrations different by one digit from one another, that is, 0.25 mg/L, 2.5 mg/L and 25 mg/L, were prepared and flowed through the fly ash satisfying the specific conditions described above to confirm the effect of absorbing phosphorus, thereby giving the results shown in FIG. 15. As can be understood from the results shown in FIG. 15, the desired effect of adsorbing phosphorus can be achieved regardless of the concentration of phosphoric acid, and the effect of adsorbing phosphorus is significantly exhibited as the concentration of phosphoric acid is increased. Accordingly, the system is effective for treatment of various types of eutrophicated lakes or the like and can be particularly preferably applied to highly eutrophic lakes or the like.

According to the method for removing phosphorus and the method for reutilizing recovered phosphorus according to the present embodiment, there was found, in one aspect, the mechanism of removal that when fly ash containing about 3% or more calcium oxide as a component is dipped in a phosphoric acid solution, phosphorus contained in the phosphoric acid solution reacts with calcium in calcium oxide contained in the fly ash to form sparingly-soluble calcium phosphate thereby being precipitated, and eutrophic water as a treatment target is fed to fly ash containing about 3% or more calcium oxide as a component, more preferably, eutrophic water in a water area as a treatment target flows through a treatment equipment charged with fly ash containing about 3% or more calcium oxide as a component, installed outside the system of the water area as a treatment target, and then phosphorus contained in the eutrophic water is allowed to react with calcium to form calcium phosphate, thereby being precipitated and recovered to enable efficient treatment of the eutrophic water, and when calcium oxide contained in the fly ash reaches the reaction capacity, the fly ash in the treatment equipment installed outside the system of the water area as a treatment target can be replaced with fresh fly ash containing about 3% or more calcium oxide, thereby exhibiting an effect of inexpensive treatment without necessity for dredging treatment and without generating excessive sludge due to dredging. The replaced fly ash is free from sludge or the like, contains phosphorus in high yield and can be effectively reutilized as a phosphorous fertilizer for agriculture and horticulture.

According to the method for removing phosphorus and the method for reutilizing recovered phosphorus according to the present embodiment, there was found, in another aspect, the mechanism of removal that when double-structure fly ash having fine particles included in a cavity in a hollow-particle structure having a hole in a part of the surface is dipped in a phosphoric acid solution, phosphorus contained in the phosphoric acid solution flows into the open hole on the surface of the hollow-particle structure, thereby being adsorbed into the inside of the double-structure fly ash, and eutrophic water as a treatment target is fed to double-structure fly ash having fine particles included in a cavity in a hollow-particle structure having a hole in a part of the surface, more preferably, eutrophic water as a treatment target flows through a treatment equipment charged with double-structure fly ash having fine particles included in a cavity in a hollow-particle structure having a hole in a part of the surface, arranged outside of the system of the water area as a treatment target, whereby phosphorus contained in the eutrophic water is adsorbed into, and recovered in, the inside of the double-structure fly ash, thereby enabling efficient treatment of the eutrophic water, and when the adsorption capacity of the fly ash is saturated, the fly ash in the treatment equipment installed outside the system of the water area as a treatment target can be replaced with fresh double-structure fly ash having fine particles included in a cavity in a hollow-particle structure having a hole in a part of the surface, thereby exhibiting an effect of inexpensive treatment without necessity for dredging treatment and without generating excessive sludge due to dredging. The replaced fly ash is free from sludge or the like, contains phosphorus in high yield and can be effectively reutilized as a phosphorous fertilizer for agriculture and horticulture.

According to the method for removing phosphorus and the method for reutilizing recovered phosphorus according to the present embodiment, there was found, in still another aspect, the mechanism of removal that when double-structure fly ash containing about 3% or more calcium oxide as a component and having fine particles included in a cavity in a hollow-particle structure having a hole in a part of the surface is dipped in a phosphoric acid solution, phosphorus contained in the phosphoric acid solution reacts with calcium in calcium oxide contained in the fly ash to form sparingly-soluble calcium phosphate thereby being precipitated, and simultaneously phosphorus contained in the phosphoric acid solution flows into the open hole on the surface of the hollow-particle structure thereby being adsorbed into the inside of the double-structure fly ash, and when eutrophic water as a treatment target is fed to double-structure fly ash containing about 3% or more calcium oxide as a component and having fine particles included in a cavity in a hollow-particle structure having a hole in a part of the surface, more preferably, when eutrophic water in a water area as a treatment target flows through a treatment equipment charged with double-structure fly ash containing about 3% or more calcium oxide as a component and having fine particles included in a cavity in a hollow-particle structure having a hole in a part of the surface, installed outside of the system of the water area as a treatment target, phosphorus contained in the phosphoric acid solution reacts with calcium in calcium oxide contained in the fly ash to form calcium phosphate thereby being precipitated and recovered, and phosphorus contained in eutrophic water is adsorbed into the inside of the double-structure fly ash thereby enabling efficient treatment of the eutrophic water, and when calcium oxide contained in the fly ash reaches the absorption capacity and the absorption capacity of the fly ash is saturated, the fly ash in the treatment equipment installed outside the system of the water area as a treatment target can be replaced with fresh double-structure fly ash containing about 3% or more calcium oxide and having fine particles included in a cavity in a hollow-particle structure having a hole in a part of the surface, thereby exhibiting an effect of inexpensive treatment without necessity for dredging treatment and without generating excessive sludge due to dredging. The replaced fly ash is free from sludge or the like, contains phosphorus in high yield and can be effectively reutilized as a phosphorous fertilizer for agriculture and horticulture.

Thus, according to the method for removing phosphorus and the method for reutilizing recovered phosphorus according to the present embodiment, eutrophic water flows through the treatment equipment 12 charged with the fly ash 11 satisfying the predetermined conditions, installed outside of the system of the water area 15 as a treatment target, and phosphorus contained in the eutrophic water is purified and recovered according to the phosphorus-removing mechanism of the fly ash satisfying the predetermined conditions, thereby enabling efficient treatment of the eutrophic water. When the phosphorus-removing ability of the fly ash 11 satisfying the predetermined conditions is saturated, the fly ash only in the treatment equipment 12 installed outside of the system of the water area 15 as a treatment target can be replaced with fresh fly ash 11 (the granulated fly ash 14) satisfying the predetermined conditions, thereby inexpensively realizing a removal method capable of recovering phosphorus without necessity for dredging treatment and without generating excessive sludge due to dredging.

The used fly ash 11 (the granulated fly ash 14) replaced after the ability thereof to remove phosphorus is saturated, is free from sludge or the like and contains phosphorus in high yield, and therefore, as shown in FIG. 9, the used granulated fly ash 14 removed from the treatment equipment 12 is divided into individual fly ashes 11 and can be effectively reutilized as a phosphorous fertilizer for agriculture and horticulture. The double structure of the fly ash 11 is utilized so that the fly ash can be utilized as a soil improvement agent.

Further effect and modifications can be readily derived by persons skilled in the art. Therefore, a more extensive mode of the present invention is not limited by the specific details and the representative embodiment. Accordingly, various changes are possible without departing from the spirit or the scope of the general concept of the present invention defined by the attached claims and the equivalent.

What is claimed is:

1. A method for removing phosphorus comprising:
   supplying eutrophic water as a treatment target to double-structure fly ash containing about 3% or more calcium oxide as a component and having a hollow-particle structure with a hole on a part of a surface of the fly ash and a cavity of the hollow-particle structure embedding fine particles, thereby removing phosphorus contained in the eutrophic water.

2. The method for removing phosphorus according to claim 1, wherein phosphorus contained in eutrophic water reacts with calcium in calcium oxide contained in the fly ash to form sparingly-soluble calcium phosphate, and simultaneously flows into an open hole on the surface of the hollow-particle structure and is adsorbed into inside of the double-structure fly ash, thereby removing phosphorus contained in the eutrophic water.

3. The method for removing phosphorus according to claim 1, wherein the fine particles in the cavity are embedded in a porous shape.

4. The method for removing phosphorus according to claim 1, wherein the double-structure fly ash has a size equal to or more than a predetermined radius.

5. The method for removing phosphorus according to claim 1, wherein fly ash obtained by granulating to a size equal to or more than a predetermined size or by solidifying into agglomerates and subsequent milling and refining is used.

6. A method for reutilizing recovered phosphorus comprising:
   using the fly ash used in removing phosphorus contained in eutrophic water in a water area as a treatment target by the method for removing phosphorus according to claim 1, as a phosphorous fertilizer for agriculture and horticulture.

7. A method for removing phosphorus comprising:
   granulating double-structure fly ash containing about 3% or more calcium oxide and having a hollow-particle structure with a hole on a part of a surface of the fly ash and a cavity of the hollow-particle structure embedding fine particles, or solidifying the fly ash into agglomerates and subsequent milling and refining;
   allowing the obtained fly ash to flow into a rangeland as a treatment target or into a water area thus spreading directly to an eutrophicated land surface; and
   adsorbing phosphorus contained in rainwater with which feces and urine from domestic animals on that land surface are washed, thereby removing phosphorus.

8. A method for reutilizing recovered phosphorus comprising:
   using the fly ash having phosphorus adsorbed therein by the method for removing phosphorus according to claim 7, as it is as a phosphorous fertilizer for growing grass.

* * * * *